June 1, 1943.   W. A. CURRY   2,320,511
HACK SAW
Filed Feb. 28, 1941
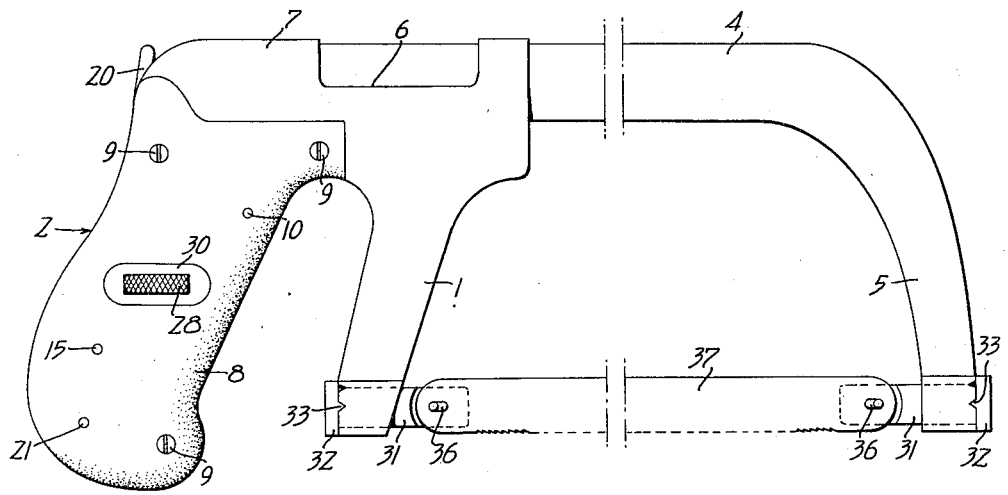
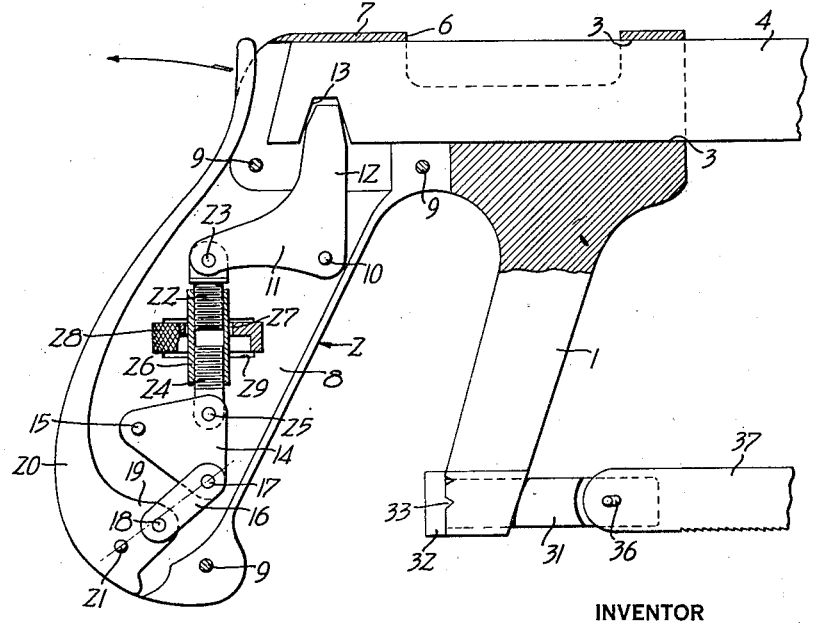
INVENTOR
WALTER A. CURRY
BY Boyken & Mokler
ATTORNEYS Patented June 1, 1943

2,320,511

UNITED STATES PATENT OFFICE 2,320,511

HACKSAW

Walter A. Curry, Oakland, Calif.

Application February 28, 1941, Serial No. 381,024

7 Claims. (Cl. 145—33)

This invention relates to hack saws and the like, and has for one of its objects an improved construction in a hacksaw providing strong, easily operated, and positive means for tightening a hack saw blade to the hack saw frame ready for use, and which construction further provides a comfortable, simple, hand gripping handle that carries the tightening mechanism substantially concealed yet instantly available for use in tightening or removing, or adjusting the blade of the hack saw.

Another object is the provision of a hack saw frame of generally conventional appearance, but which frame has the blade loosening and tightening mechanism on the handle, and so arranged as to provide several adjustments of blade tension, and to also provide for removal of the blade and for readily turning the blade on its axis to lie in planes perpendicular to each other. Other objects and advantages will appear in the description and drawing annexed hereto.

In the drawing, Fig. 1 is a side elevational view of my improved hack saw, broken longitudinally to accommodate the sheet.

Fig. 2 is an enlarged part sectional and part elevational view of the blade tightening and loosening mechanism.

Briefly described, most conventional hack saws include elements forming a generally, inverted U-shaped frame the legs of which carry at their outer ends shackles, or threaded, or plain bolts or pins rotatably supported in coaxial alignment, such shackle, bolt or the like having a laterally projecting pin adopted respectively to engage openings formed in opposite ends of the hack saw blade. These shackles, bolts or pins may be formed to coact with the legs of the frame to prevent rotation thereof when the blade is tightened, but are free for axial movement to positions releasing the same for rotation to different degrees of rotation when the blade is loosened, and ordinarily a pistol grip type of handle is carried by the hack saw frame spaced outwardly of one of the legs thereof for grasping by an operator when the saw is to be used. United States patents to Biester, 2,116,137, May 3, 1938; Carroll, 2,194,494, March 26, 1940, and Garner 1,663,076, March 20, 1928, show the above conventional elements. No claim is broadly made herein to the mere provision of a frame of the general character specifically described above, since my frame broadly includes the element as mentioned.

Heretofore, many structures have been suggested for enabling the operator of a hack saw of the general type above described, to quickly and positively loosen the blade for removal or adjustment, and to tighten the loosened blade. Most hack saw blades now in use are twelve inch blades, but this length varies in different blades of different manufacturers as much as a quarter of an inch. Since a blade, when in use, must be held firmly at each end with sufficient tension and rigidity to substantially resist the tendency of the blade to twist when sawing along a curved line, it is manifest that provision must be made for securing the desired tension irrespective of the variation in the lengths of the blades used.

The user of a hack saw, and particularly the more constant user, is concerned principally with getting a job done as speedily as possible. If the blade becomes dull or breaks, it is essential that provision be made for effecting a speedy replacement in the simplest way without possible injury to his hands or fingers. If the length of the new blade varies slightly from that of the old one, an equally speedy and simple means must be provided for compensating for said variation. After the blade is changed and tightened, the blade suporting frame and handle must be rigid without the possiblity of accidental collapse or loosening, and without projecting parts or roughness or interference with the hands of the operator. My invention includes the objects of providing a construction that accomplishes the above desired results.

In detail, my hack saw frame is of generally inverted U-shape in which one of the legs I thereof is provided with a hollow handle 2 spaced therefrom and generally parallel therewith, the handle connecting with the said leg I at one of its ends only by a horizontally elongated head, extending across the upper ends of the handle and leg. This head is formed with a horizontally extending, generally rectangular passageway 3 in which is slidably supported for longitudinal movement therein, the bar 4 that connects between leg I and the other leg 5 of the U-frame, said bar and said leg 5 being integrally united and supporting leg 5 being spaced from leg I in a position in which the legs I, 5 and handle 2 are disposed in the same vertical plane. The passageway 3 corresponds in cross section to the cross sectional shape of the bar 4 and may be cut away at its upper side, as at 6, if desired, leaving an extension 7 of the upper wall disposed substantially over the upper end of the handle 2, but below said wall the passageway in which the bar 4 slides opens into the hollow portion of the handle.

The handle 2 is closed by lateral side walls 8 at least one of which is adapted to be bolted, as by screws 9, or otherwise removably secured in place closing the interior of the handle. Within the handle 2 and supported therein on pivot 10 is a bell crank, one arm 11 of which extends laterally and rearwardly relative to the edge of the handle adjacent the leg I, while the other arm 12 extends vertically toward the upper wall extension 7. The rear end portion of bar 4 that extends below the wall extension 7 is formed with a downwardly opening recess 13 in its lower edge into which the uppermost end of arm 12 is adapted to fit with slight looseness. The opposite sides of said recess (in the bar) extend convergently upwardly and the end of arm 12 that fits in said recess is correspondingly shaped so that pivoting of the crank on pivot 10 in one direction will cause the bar 4 to be moved longitudinally, in an outward direction relative to the handle and leg 1.

The outer end of arm 11 is connected by a substantially vertical link with one corner of a triangular plate 14 that is in the handle, and between the sides 8 thereof, in the lower portion of said handle. This plate 14 is pivotally supported on the handle on a horizontal pivot 15 at one of its other corners, which pivot is laterally offset in the plane of the handle toward the rear edge of the latter. The third corner of plate 14, which is disposed generally vertically below and in about vertical alignment with the said link, and a second relatively short link 16 is secured by horizontal pivot 17 to said third corner while the opposite end of link 16 is pivotally secured at 18 to a projection 19 that is on a lever 20. Said lever is pivoted to handle 2 by horizontal pivot 21 that is adjacent but offset to one side of pivot 18 but at a level below pivot 19.

The aforesaid vertical link that connects the arm 11 with plate 14 is generally in the form of a turnbuckle, in which there is a pair of right and left hand screws in axial alignment threadly engaging right and left hand threads on a sleeve connecting the screws at their adjacent ends so that upon turning the sleeve in one direction the screws will move axially toward each other and opposite turning of the sleeve will cause the screws to move axially apart.

The upper screw 22 is secured at its upper end to the outer end of arm 11 by a horizontal pivot 23, while the lower screw 24 is secured at its lower end to the corner of plate 14 by a horizontal pivot 25. The interiorly threaded sleeve 26 is square in exterior cross-sectional contour and extends relatively loosely through a square central opening 27 in a horizontal disk 28, which disk is rotatably supported in corresponding openings 29 that are formed in the sides 8 of the handle so that the peripheral edges of said disk at its two opposite sides are exposed at said opposite sides of the handle, and slightly project through said openings for engagement of the knurled or milled peripheral edges of the disk by the thumb or fingers of the hand of an operator. Preferably, the opposite sides 8 of the handle are depressed inwardly toward each other at the margins of opening 29 as at 30 so that the projecting edges of the disk will be about even with the plane of the main outer surface of the handle that extends to said depressed margins.

The lever 20 is exteriorly curved at the lower end to conform to the general curvature of the handle, and said lever normally lies between the opposed margins of sides 8 at the rear edges of the latter, and is curved to correspond to said edges in such a manner that the said edges are flush with the outwardly and rearwardly facing side of the handle when the latter is in closed position. The upper end of said lever is slightly spaced from the rear edge of wall extension 7 so as to enable the operator to obtain a sufficient engagement with said end by a finger for swinging the lever outwardly on its pivot 21.

Legs 1, 5 of the frame of my saw carry at their lower ends conventional horizontally aligned, short shafts or shackles 31 that have heads 32 formed with one or more projections 33 that are adapted to fit in complementary recesses in the opposite outer sides of said legs 1, 5 adjacent the bore of each leg through which each shaft extends. These notches are formed in said sides at at least an angle of 90° to each other about the axis of each shaft, and the shafts are rotatable and slidable in the ends of said legs, so as to enable the said shafts to be rotated on their axes when moved axially so that the projections 33 clear the recesses in which they are seated, after which rotation to the desired degree they may be moved axially in a reverse direction to re-seat in a near recess after which they will be held against rotation.

The inner adjacent ends of shafts 31 are cut away on one of their lateral sides to provide a flat face from each of which a pin 36 projects outwardly and in a direction inclined toward the leg nearest thereto.

The conventional hack saw blade 37 is formed with openings at its opposite ends, which openings are adapted to slide over the pins 36, so that one of the flat sides of the blade at its opposite ends will be flat against the flattened side of each shaft.

In operation in installing a blade, the operator will first swing the lever 20 outwardly in the arc indicated by the arrow. This movement causes the bar 4 to be moved longitudinally in direction to carry leg 5 toward leg 1, thereby enabling a hack saw blade to be connected at its ends with pins 36. The lever 20 is then swung back to the closed position, as indicated in the drawing, and if for any reason the tension on the blade is too tight or too loose, the operator merely swings lever 20 outwardly again, and rotates disk 28 in one direction or the other, as may be desired, for causing the arm 12 of the bell crank to change its position relative to the longitudinal axis of bar 4 to a position where the movement of lever 20 to closed position, as shown in the drawing, will provide the desired tension on the blade.

The degree of movement of bar 4 by actuation of lever 20 is sufficient to enable the shafts 31 to be moved axially outwardly, when the lever is swung outwardly, so as to turn the shafts, with the blade carried thereon, to the desired degree, so the plane of the blade will be substantially coincident with the plane of the saw frame, or at right angles thereto.

It is to be noted that the pivot 18 connecting link 16 with the lever, moves slightly across a straight line extending through pivots 17, 21 when the lever moves to closed position; thus holding the lever against accidentally swinging to open position, but with slight force the lever can be swung in the direction of the arrow (Fig. 2) to carry pivot 18 back over the line extending through pivots 17, 21 so as to enable free movement of the lever to full open position once said line is so crossed by pivot 17. In other words, the dead center position of pivots 17, 18, 21 is where the three are positioned in a line, and movement of pivot 18 generally downwardly across this line results in holding the lever in closed position with the blade taut, while the opposite movement of the pivot results in releasing the tension on the blade and lever for removal or replacement of a blade or for turning the blade and shafts 31 about the central axis of the latter.

By the foregoing construction, it will be seen that the handle 2 and leg 1 are rigid at all times and the blade is tightened by movement of the outer leg 5 away from the handle and leg 1, as a unit with bar 4, and, by the outward swinging of lever 20 in direction outwardly of the handle 2 away from leg 1, eliminating the awkward and unsatisfactory method that has been heretofore employed of either pivoting the handle or pivoting a lever between the handle and blade, or moving the leg of the frame nearest the handle relative to the latter. The advantages of moving the outer leg, in hack saws, including the bar that carries the same, for tensioning the blade, has long been recognized as the desirable practice, but for effecting said movement by a quick acting lever, as arranged by applicant, is believed to be new. The arrangement of the adjusting device, such as disk 28, separate from the shafts or shackles connecting with the blades, provides a simple, firmly supported arrangement that eliminates the use of screws etc. on such movable shafts, and which device in combination with the main tightening lever, enables the operator to very quickly obtain the desired tension on the blade.

Having described my invention, I claim:

1. In a hack saw having a pair of spaced legs respectively provided with elements at one of their ends for detachably securing opposite ends of a saw blade thereto, and a bar connecting the opposite ends of said legs; a handle adapted for manual grasping extending alongside one of said legs, rigid therewith; means carried by said handle and said latter leg slidably supporting said bar for longitudinal movement of the latter in a direction transversely of said latter leg and said handle; screw means within said handle rotatable about an axis generally perpendicularly of the length of said bar; means actuated by rotary movement of said screw means connected with said bar for causing longitudinal movement of said bar when said screw means is rotated; and manually actuable means carried by said handle connected with said screw means for rotation of the latter; said manually actuatable means being exposed to the outside of the handle for manual actuation thereof.

2. In a construction as defined in claim 1, a lever connected with said screw means for moving said screw means axially of said axis independently of said manually actuatable means; the means actuated by said screw means including a bell crank lever one of the arms of which is connected with said bar and the other of which is connected with said screw means; said screw means being adapted to actuate said bell crank in similar directions upon independent actuation of said lever and said screw means.

3. A hack saw comprising a generally U-shaped frame provided with a saw blade detachably secured at its opposite ends to the free ends of the legs of said frame; the connection between the opposite ends of said legs comprising a straight bar integral with one of said legs; a handle substantially parallel with the other of said legs and spaced outwardly therefrom relative to the pair of legs; a head rigidly secured to the end of said handle and to one end of said other leg formed with a passageway slidably supporting one end of said bar thereon for longitudinal movement of the latter; said handle being hollow and bar actuating means enclosed within said handle pivotally connected with said bar at a point within said head for causing said movement of said bar, when actuated, and a lever pivotally supported at the end of said handle that is opposite said head connected with said bar actuating means for so actuating said latter means when said lever is swung on its pivot; said lever being normally disposed on the side of said handle remote from said pair of legs for swinging from a position against said handle to a position outwardly of said handle and said pair of legs.

4. In a construction as defined in claim 3, the pivotal connection between said bar and said bar actuating means comprising a recess in a side of said bar and a complementary formed movable element in said recess; said movable element being one of the arms of a bell crank lever pivoted to said handle.

5. In a hack saw having a pair of spaced legs provided with elements at one of their ends for detachably securing the ends of a saw blade thereto, and a bar formed integrally with one of said legs extending between the opposite ends of said legs and slidably supported on the other of said legs for longitudinal movement; a handle for manual grasping rigidly connected with said other leg and spaced therefrom; bar moving means enclosed within said handle connected directly with said bar for causing said longitudinal movement of said bar; manually actuatable means on said handle exposed for manual manipulation and connected with said bar moving means for actuating said bar moving means to cause said movement of said bar; said bar moving means including a lever pivotally secured to said handle and adjacent thereto, and a pair of pivoted bell-crank elements; means connecting one arm of one of said crank elements with said bar; means connecting one arm of the other of said crank elements with said lever; and a link connecting the other arms of said crank elements; the arm connected with said bar being arranged and adapted to slide said bar in one direction or the other upon actuation of the said other of said crank elements by movement of said lever in one direction or the other about its pivot.

6. A hack saw comprising: a handle and a first leg generally parallel thereto and spaced therefrom; means rigidly connecting one of the ends of said leg and handle; a second leg spaced from said first leg; a bar rigid with said second leg slidably carried by said means for reciprocating movement of said bar in opposite directions; said handle being hollow, and an element enclosed therein and pivotally supported therein for generally oscillatory movement of one end thereof; said one end of said element being connected with said bar for causing said reciprocatory movement of said bar upon said movement of said end; a lever closely alongside the side of said handle that is remote from said first leg; a pivot securing said lever to said handle for oscillatory movement of said lever; and means connecting said lever with said element for causing said oscillatory movement of said element and said reciprocatory movement of said bar upon said oscillatory movement of said lever.

7. In a construction as defined in claim 6, said handle being formed with a recess extending longitudinally thereof in the side thereof that is remote from said first leg, and said lever being adapted to fit in said recess when moved in direction toward said handle.

WALTER A. CURRY.